(12) United States Patent
Guha et al.

(10) Patent No.: US 8,441,942 B1
(45) Date of Patent: May 14, 2013

(54) METHOD AND APPARATUS FOR LINK LEVEL LOOP DETECTION

(75) Inventors: Sumit Guha, San Jose, CA (US);
Tejeswar Pichuka, Cupertino, CA (US);
Sanjoy Bardhan, San Jose, CA (US);
Pawan K. Singal, Santa Clara, CA (US)

(73) Assignee: Tellabs Operations Inc., Naperville, IL (US)

( * ) Notice: Subject to any disclaimer, the term of this patent is extended or adjusted under 35 U.S.C. 154(b) by 132 days.

(21) Appl. No.: 12/327,540

(22) Filed: Dec. 3, 2008

(51) Int. Cl.
*H04J 1/16* (2006.01)

(52) U.S. Cl.
USPC .......................................... 370/242; 370/216

(58) Field of Classification Search .......... 370/216–228, 370/241–249, 252, 253
See application file for complete search history.

(56) References Cited

U.S. PATENT DOCUMENTS

| | | | |
|---|---|---|---|
| 5,341,504 A * | 8/1994 | Mori et al. | 712/12 |
| 7,672,245 B2 * | 3/2010 | Yasuie et al. | 370/249 |
| 2006/0013141 A1 * | 1/2006 | Mutoh et al. | 370/241 |
| 2006/0126517 A1 * | 6/2006 | Kurosaki et al. | 370/241 |
| 2007/0230357 A1 * | 10/2007 | Lin et al. | 370/241.1 |
| 2007/0274204 A1 * | 11/2007 | Varada et al. | 370/218 |
| 2008/0062874 A1 * | 3/2008 | Shimadoi | 370/232 |
| 2009/0161562 A1 * | 6/2009 | Shah et al. | 370/245 |

\* cited by examiner

*Primary Examiner* — Kan Yuen
(74) *Attorney, Agent, or Firm* — Jamer M. Wu; JW Law Group

(57) ABSTRACT

A method and system of loop detection for improving network performance and data integrity over a communications network are disclosed. A process is capable of transmitting a diagnostic packet stream from a source object to a destination object. The diagnostic packet stream, in one embodiment, is an IEEE 802.1ag continuity check message and is transported to a destination object periodically across a communications network. Upon receipt of a returning packet stream from the destination object, the process broadcasts loop detection at a port level in response to the comparison between the returning packet stream and the diagnostic packet stream.

15 Claims, 6 Drawing Sheets

METHOD AND APPARATUS FOR LINK LEVEL LOOP DETECTION

FIELD

The exemplary embodiment(s) of the present invention relates to communications network. More specifically, the exemplary embodiment(s) of the present invention relates to network performance.

BACKGROUND

A high-speed network environment typically includes network devices such as routers and switches that facilitate delivery of information packets from source devices to destination devices. Information pertaining to the transfer of information packet(s) through the network is usually embedded within one or more packets. Each information packet traveling through a network can typically be handled independently from other packets in a packet stream. For example, each router within a network processes incoming packets and determines where the packet(s) should be forwarded. In a modern computing network environment, the speed of packet processing or routing can be critical in determining the performance of overall network system.

In a computing network environment, which may include one or more service providers' networks, input/output ("I/O") ports on various nodes are occasionally tested for diagnostic purposes. Sometimes, the loops might be created accidentally due to reasons such as hardware and/or software failures. The occurrence of a loop condition at a port can potentially cause broadcast storms when, for example, multicast traffic gets looped back, and/or affect point-to-point network services. Broadcast storms typically take down a portion or an entire communications network and consequently affect overall system performance.

A conventional approach to detect a loop condition is to employ some standard diagnostic tools such as spanning tree protocol ("STP") to identify loop condition in connection to a network service. A drawback associated with the conventional approach is that it is implemented at service level, wherein the service level loop detecting is typically difficult to isolate location of the loop(s) at the port level. For instance, if there is no bridging service on the port i.e. if the port is used for point-to-point services or IP service, STP may not be used to detect loop.

SUMMARY

A method and system of loop detection for improving network performance and data integrity over a communications network are disclosed. A process is capable of transmitting a diagnostic packet stream from a source object in response to a loop detected in a network across a link. The diagnostic packet stream, in one embodiment, is a IEEE 802.1ag continuity check message and is transported periodically across a communications network. Upon receipt of a returning packet stream from the destination object, the process declares loop detection at a port level in response to the comparison between the returning packet stream and the diagnostic packet stream.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, system and apparatus capable of detecting loop conditions to improve overall network performance.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of this disclosure.

A method of loop detection for enhancing network performance and data integrity over a network is described. After composing a diagnostic packet stream such as an IEEE 802.1ag continuity check message, a process is used to transmit the diagnostic packet stream from a source object (or port). The diagnostic packet stream, in one embodiment, is transported across a link periodically at a configurable frequency. Upon receipt of a returning packet stream due to a loop, the process declares loop detection at a port level in based on a comparison between the returning packet stream and the diagnostic packet stream.

Figure 1:
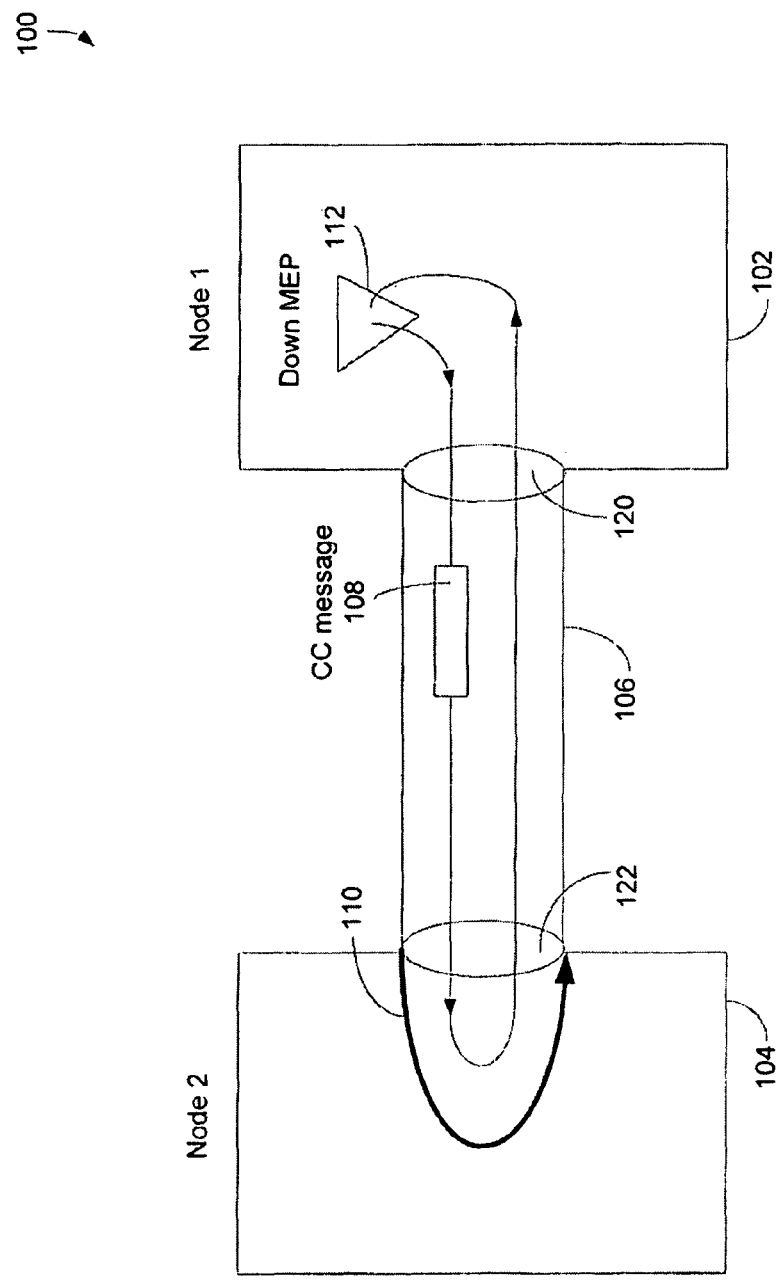
FIG. 1 is a block diagram illustrating a communications network having a loop detecting mechanism in accordance with one embodiment of the present invention.

FIG. 1 is a block diagram 100 illustrating a communications network having a loop detecting mechanism in accordance with one embodiment of the present invention. Diagram 100 includes a node 102 and a node 104, wherein nodes 102-104 can be routers, switchers, bridges, hubs, logic entities, objects, or the likes. Node 102 and node 104 are coupled via a network connection 106, which can be a cable(s), an optical fiber, and/or a combination of the cable, and optical fibers.

Nodes 102-104 include input/output ("I/O") ports 120-122, respectively, wherein ports 120 and 122 are capable of transmitting and receiving information between nodes 102-104 via connection 106. Connection 106, for example, may be an Ethernet cable, USB (Universal Serial Bus) cable, phone lines, twisted pair cables, optical cables, and/or a combination of the above-mentioned connections. In one embodiment, connection 106 is configured to support one or more of the services such as point-to-point, point-to-multipoint (bridging), multipoint-to-multipoint (IP) and so on. For some exemplary applications, such as IPTV, VoD, video conferencing, real time data, stock transactions, can employ the loop detecting mechanism to enhance communication performance.

Nodes 102-104, in one aspect, are configured to use an Ethernet based communications network, which can be used for local area networks ("LANs"). The Ethernet based network is capable of accessing network devices in accordance with media access control ("MAC") addresses through physical or link layers.

Nodes 102-104, in one embodiment, are configured to employ connectivity fault management ("CFM") in accordance with IEEE 802.1ag. IEEE 802.1ag Ethernet CFM Protocol includes continuity check, link trace and loopback protocols for assisting network operators to maintain/manage the network. 802.1ag defines a construct called MEP, which is capable of sending periodic CCM (Continuity check messages) PDUs (protocol data units) and is capable of receiving CCM PDUs. The MEP can be configured to send CCM into the relay entity, thus multicasting the packet into the network (UP MEP) or it can be configured to send CCM away from the relay entity into the port (Down MEP). Since Down MEP sends in the direction of port, it is well suited to employ as a protocol entity to detect loops at link level. It is to be noted that both Up MEP & down MEP are capable of receiving the CCMs alike.

During an operation, a Down MEP is enabled on link or links which need to be monitored and CC messages are periodically sent from these Down MEPs. If a loop has occurred behind a receiving port, the Down MEP, which sends CC message periodically, is capable of receiving the same CC messages back from the port having the loop (or the looping port) because of loop condition. To verify a loop condition, the MEP compares the source MAC address from the received CC message with the source MAC address of the MEP. A loop detection or loop occurrence at the port is declared when the MEP determines that a match has occurred between the source MAC address from the received CC message and the source MAC address of the MEP for configured number of contiguous CCMs.

Once a loop is detected on a port, MEP stops loop monitoring at the port until the loop condition is cleared. At the same time, the port which detected the loop at remote port is taken down (or blocked) thereby any services performed on top of this port are suspended and/or switched to an appropriate backup path.

When the loop at remote node is resolved and the operator clears the loop condition on the blocked port, the port is subsequently declared operational, and would be capable of resuming the designated network services. If the operator tries to clear the loop condition on the blocked port when the loop still exists at the remote port, the loop condition will be detected again. When loop detection is activated, the MEP loop monitor resumes and starts sending CC messages periodically. In one embodiment, the frequency of sending a CC message(s) can be configured by a user or an operator. Furthermore, the number of consecutive loop detections indications (number of consecutive returned CCMs with specified characteristic) before declaring a loop condition may also be configurable.

The embodiment(s) of loop detecting mechanism employs available port level connectivity diagnosis tools to identify an occurrence of a loop. It should be noted that the terms "loop detecting mechanism," "loop monitor," "loop detector," and "loop identifier" indicate similar device(s) and they can be used interchangeably herein. Under the Ethernet based network environment, an MEP mechanism, for example, can be used to identify a loop at the port level. Alternatively, for other network environments, similar approaches may be used to detect loop conditions at the port level.

In another embodiment, a mechanism of heart beats is used to detect loops at the link level. Heart beats is a technique used in networking wherein participating network elements such as switches and routers can periodically send packets autonomously across the network declaring that the participating network elements are alive. It should be noted that CCM are the kind of heart beats for Ethernet based network defined by IEEE 802.1ag standard.

Figure 2:
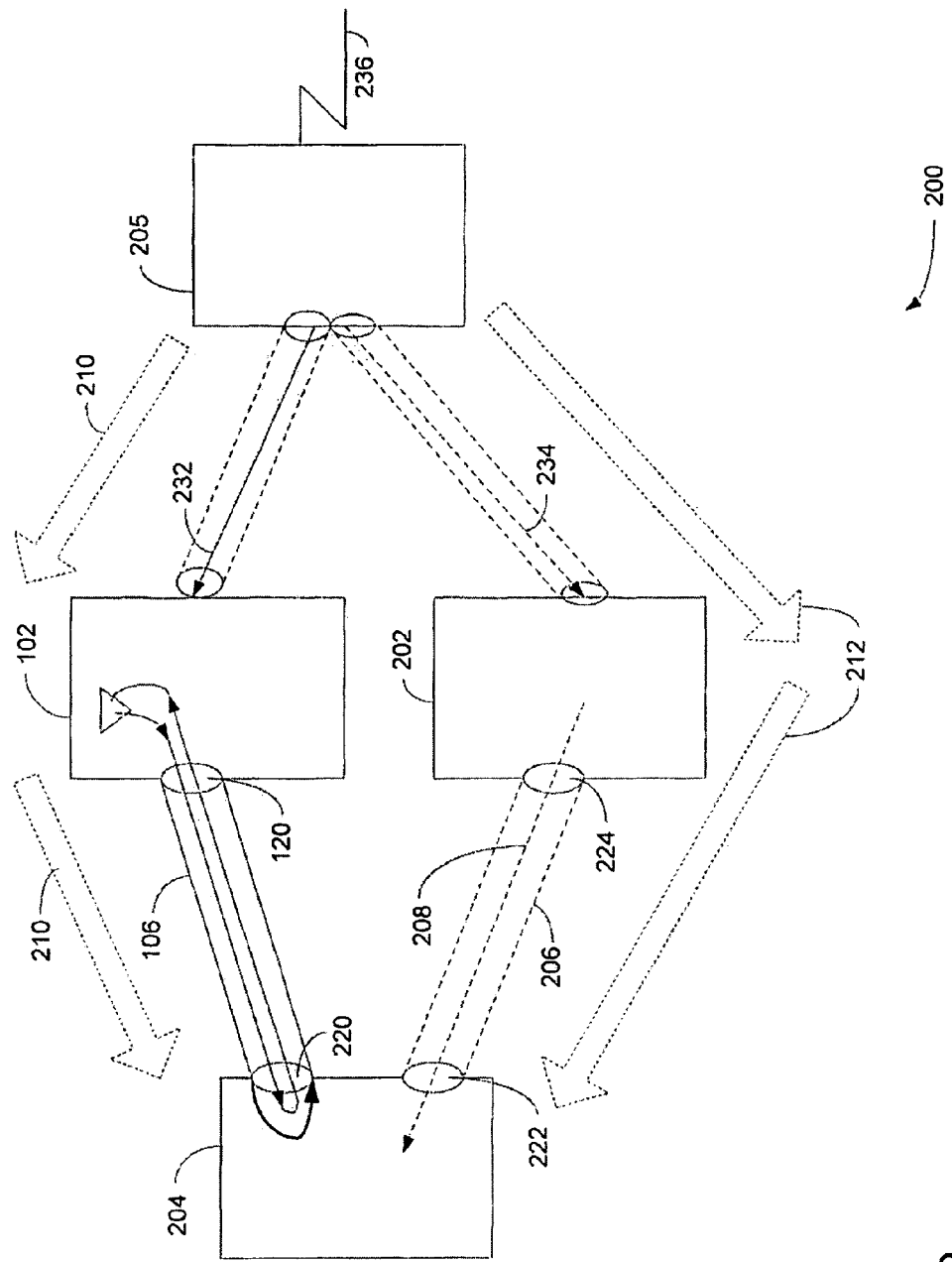
FIG. 2 is a block diagram illustrating a communications network with a backup route in accordance with one embodiment of the present invention.

FIG. 2 is a block diagram 200 illustrating a communications network with a backup route in accordance with one embodiment of the present invention. Diagram 200 includes nodes 102 and 202-205 wherein the nodes are interconnected by connections 106, 206, 232-234. Node 102 includes a port 120 and node 204 includes a port 220, wherein port 120 is coupled to port 220 via a connection 106. Node 204 includes a port 222, which is used to connect to port 224 of node 202 via connection 206. Note that the underlying concept of the exemplary embodiment(s) of the present invention would not change if one or more nodes or connections were added to or removed from diagram 200.

Diagram 200 illustrates a network having a primary route 210 and a backup route 212 for information to travel from node 205 to node 204. Primary route 210, in one aspect, is responsible for routing data packets between node 205 and node 204 via node 102. Backup route 212, on the other hand, can be activated to transmit data between node 204 and 205 via node 202 when primary route 210 is down or out of commission. Nodes 102 and 202-205 can be routers, switchers, bridges, hubs, logic entities, objects, a cluster of routers, or the likes. It should be noted that diagram 200 may have additional nodes connected via connection 236.

During operation, a loop detecting mechanism is activated between ports 120 and 220 for nodes 102 and 204, respectively. The loop detecting mechanism can be a hardware device, software routines, firmware modules, or a combination of hardware, software, and/or firmware modules. As described in FIG. 1, the loop detecting mechanism can be implemented by MEP in accordance with IEEE 802.1ag when ports are connected in an Ethernet based network. Upon detecting a loop condition at port 220 via connection 106, node 102 declares loop detection and shuts down the services on port 120. While node 102 is shutting down the network service between ports 120 and 220 and notifying the network operator about the loop condition, node 205 activates backup route 212 in response to the loop condition. After backup route 212 is activated, it begins to use node 202 to redirect data packets from node 205 to 204. For example, upon activating of backup route 212, a data packet initiated by node 205 is transmitted to node 202 via connection 234. After reaching node 202, the data packet is subsequently forwarded from port 224 of node 202 to port 222 of node 204 via connection 206. It should be noted that a loop detecting mechanism or monitor may also be activated between ports 222 and 224. In another embodiment, communications between node 204 and node 205 include additional backup paths or routes.

Figure 3:
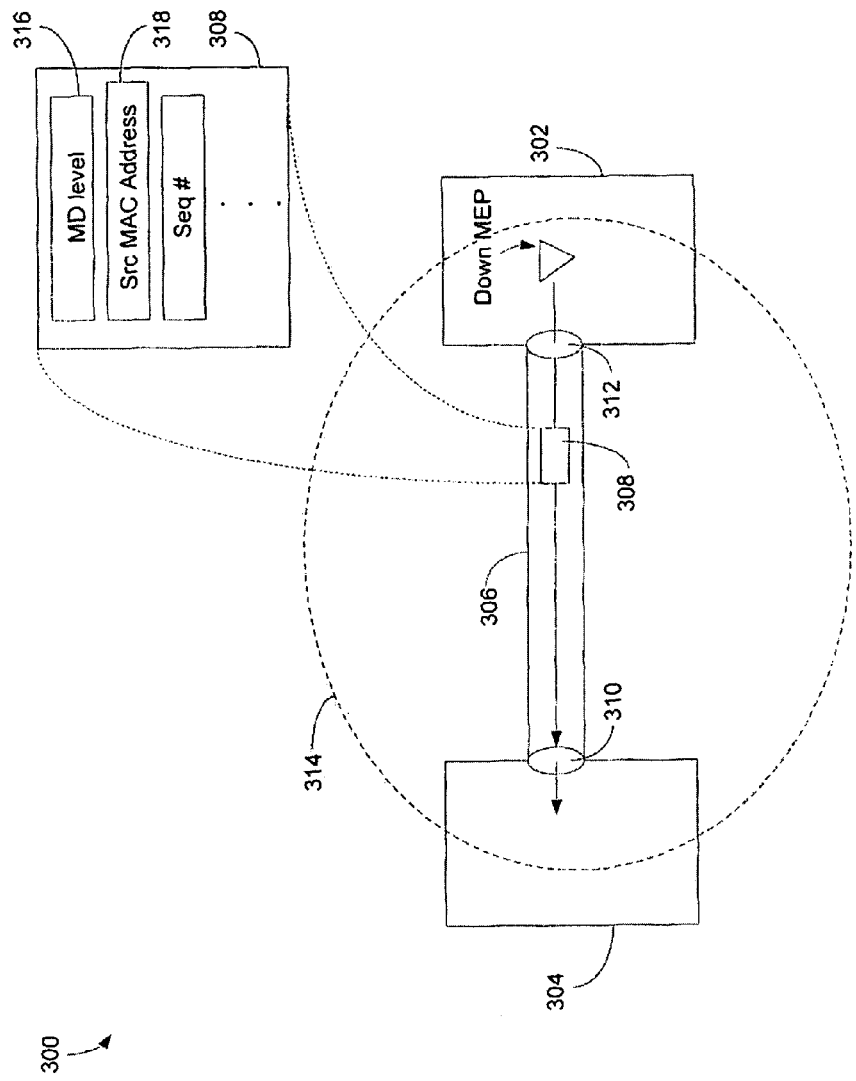
FIG. 3 is a block diagram illustrating an Ethernet based communications network using a CC message to detect a loop in accordance with one embodiment of the present invention.

FIG. 3 is a block diagram 300 illustrating an Ethernet based communications network using a CC message to detect a loop in accordance with one embodiment of the present invention. Diagram 300 illustrates a maintenance domain (MD) 314, which includes nodes 302-304. MD 314 or MD level(s) provides operation, administration, and management ("OAM") CFM for an Ethernet based network device. According to IEEE 802.1ag, network logic entities such as operators, providers, and customers can be mapped into one or more different administrative domains, wherein each administrative domain can be further arranged into one MD. Each MD can be configured to provide sufficient data for various logical entities to perform their tasks including networking management and performance monitoring.

CC message 308 is organized as a packet format as specified in the standard IEEE 802.1ag, which includes parameters such as MD level 316, sequence number, and source MAC address 318. During an operation, node 302 composes CC message 308 with appropriate parameters and periodically sends CC message 308 from port 312 of node 302 to port 310 of node 304 via connection 306.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 4A:
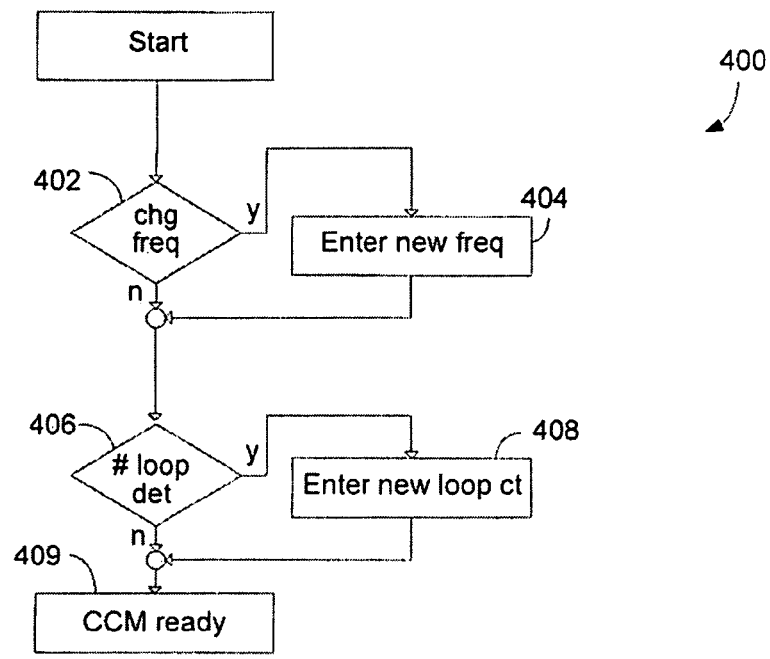
FIGS. 4(A-B) are flowcharts illustrating examples of loop detecting mechanism in accordance with one embodiment of the present invention.

FIG. 4A is a flowchart 400 illustrating an example of configuring various parameters associated with loop detecting mechanism in accordance with one embodiment of the present invention. Operator can pre-configure these values before he/she decide to activate loop detection mechanism on a port or ports. Alternatively, operator may change these values when loop detection is activated & the process is monitoring specified port or ports. All these values can be modified independently. Here in FIG. 4A, an example is shown to set these values sequentially. At block 402, the process provides an opportunity for a user (or operator) to change the time frequency for sending one or more CC message(s). For example, an operator can select from a set of pre-defined values. The set of pre-defined value, for instance can be a range of time domain from 1 second to 10 minutes. If an operator selects yes option, the process proceeds to block 404, otherwise, the process moves to block 406.

At block 404, the process allows the user to enter a frequency. For example, if the user selects one (1) second, it indicates that a CC message will be sent every second. In other words, time domain is one (1) second and MEP or Down MEP will send one CC message every second.

At block 406, the process provides an opportunity for a user, an operator, or an administrator to choose a number indicating the total number of consecutive loop detections needed before a loop condition should be declared. In one embodiment, the process allows a user to choose a number from one (1) to one thousand twenty four (1024). If a user decides to edit the number of consecutive loop detections, the process proceeds to block 408.

At block 408, the process allows a user to enter a number indicating the number of consecutive loop detections needed before a loop condition is announced. For example, if the administrator selects a number five (5), a declaration of loop condition is broadcasted if the process identifies loop detection(s) five (5) times consecutively.

At block 409, the parameters for the CCM message are set, and CCM message is ready to be sent. As described earlier, when loop detection is activated, the MEP loop monitor begins sending CC messages periodically, wherein various parameters such as frequency of sending CC message(s) can be configured by an operator.

Figure 4B:
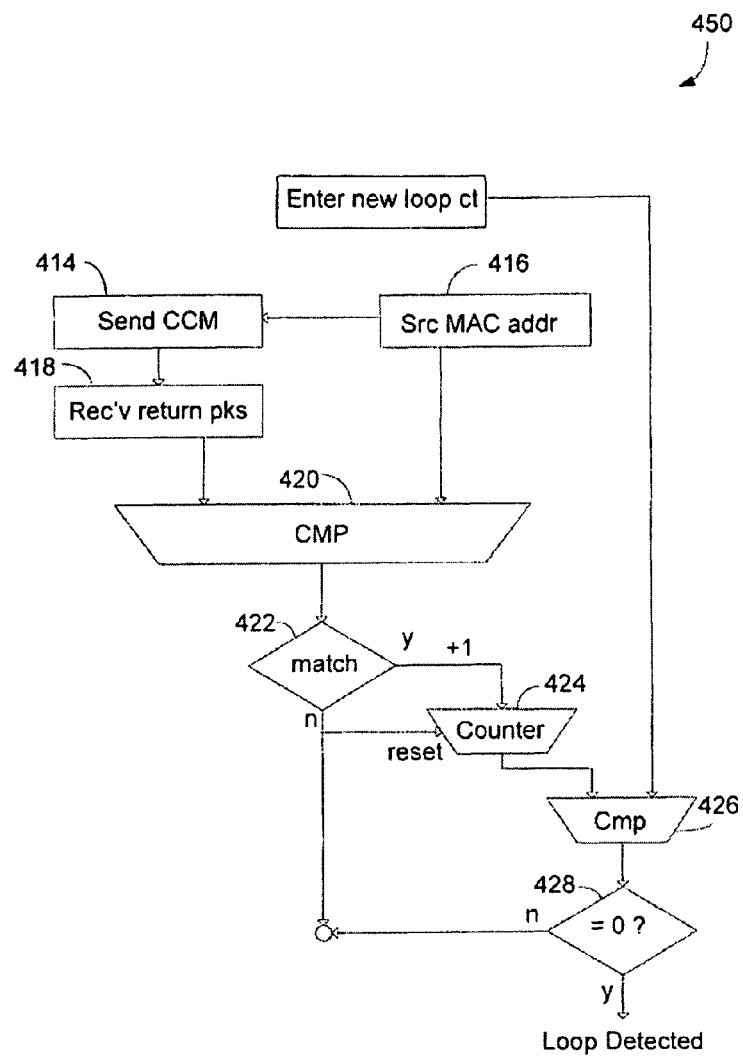

FIG. 4B is a flowchart 450 illustrating an example of sending a CCM message for a loop detecting mechanism in accordance with one embodiment of the present invention. At block 414, the process sends a CC message, which includes a source MAC address 416, to a destination port. In one embodiment, the process sends a CC message periodically, wherein the frequency of sending a CC message is determined at block 404.

At block 418, the process receives a returning packet or a CC message. After receipt of the CC message, a source MAC address is extracted and it is sent to block 420.

At block 420, the process compares the source MAC address from block 418 and the source MAC address from block 416. The result of the comparison is subsequently sent to block 422.

At block 422, the process determines whether the source MAC address from block 418 is the same as the source MAC address from block 416. If the result of comparison indicates that the two source MAC addresses are the same, the process sends a counter increment signal to block 424. Otherwise, the process sends a reset signal to block 424.

At block 424, after increasing the counter by 1, the counter value is forwarded to block 426. In one embodiment, the counter size is also configurable.

At block 426, the process compares the counter value from block 424 with a predefined number of consecutive loop detections from block 412. The result of comparison is subsequently sent to block 428.

At block 428, the process determines whether the result of comparison from block 426 equals to zero. If the comparison result is equal to zero, it indicates that the counter value from block 424 and the number of consecutive loop detections from block 412 are the same. If the comparison result is not equal to zero, the process goes to block 402 and starts the process again. On the other hand, if the comparison result is zero, a loop is detected and the process terminates.

Figure 5:
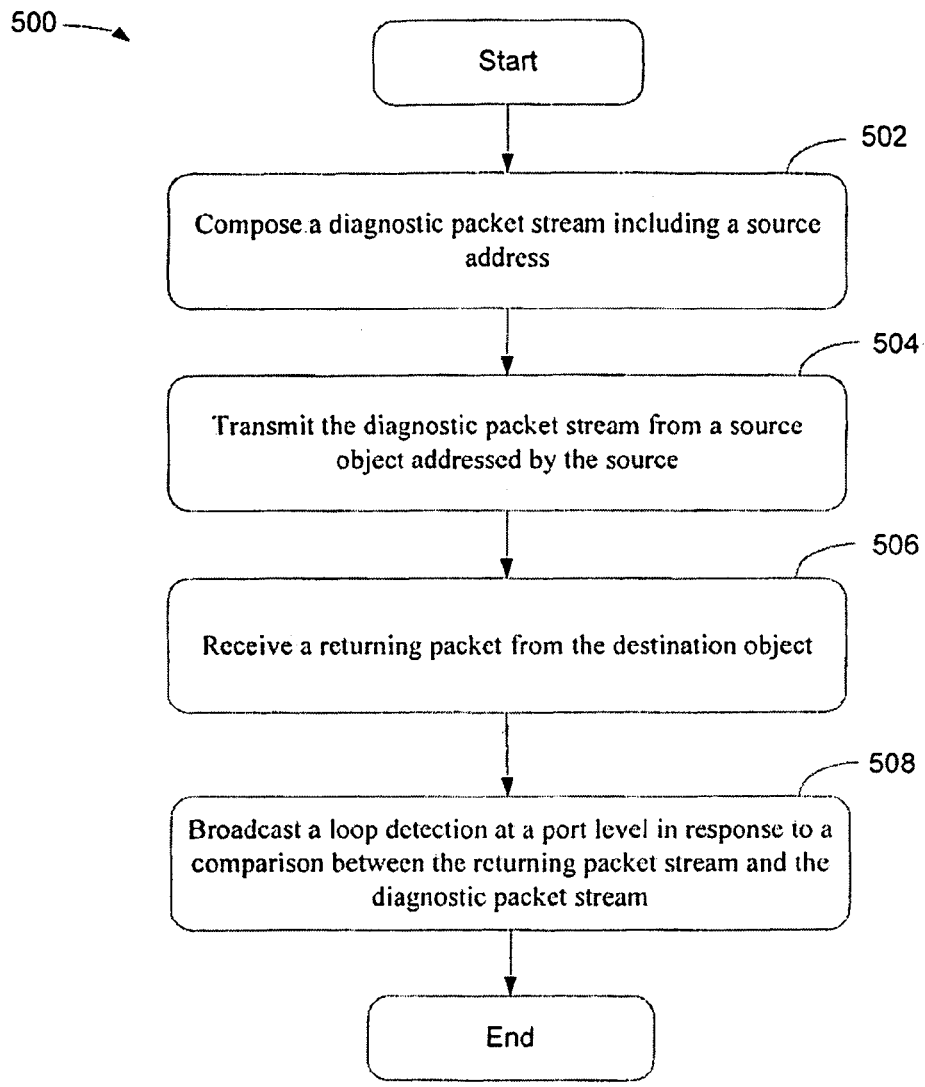
FIG. 5 is a flowchart illustrating a loop detecting implementation using a diagnostic packet stream in accordance with one embodiment of the present invention.

FIG. 5 is a flowchart 500 illustrating a loop detecting implementation using a diagnostic packet stream in accordance with one embodiment of the present invention. At block 502, a process, in one embodiment, composes a diagnostic packet stream, which includes a source address.

At block 504, the process transmits the diagnostic packet stream from a source object, which is addressed by the source address, to a destination object across a communications network in a configurable time period or time domain. For example, upon generating a CC message in accordance with the diagnostic packet stream with a MAC address, the process identifies a source MEP. The process subsequently transmits the CC message via a down MEP across an Ethernet based communications network. In one embodiment, the process is capable of setting a frequency of the configurable time period as described above.

At block 506, the process receives a returning packet from the destination object. The process, in one example, is capable of capturing a returning CC message from the destination MEP to the source MEP.

At block 508, the process broadcasts loop detection(s) at a port level in response to the comparison between the returning packet stream and the diagnostic packet stream. Upon identifying a port having a loop condition, the process reports a loop condition to the network administrator.

While particular embodiments of the present invention have been shown and described, it will be obvious to those skills in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for facilitating a communications network, comprising:
    composing a diagnostic packet stream including a source address in a source address field and a continuity check message (CCM) configured to detect connectivity failures in a maintenance association;
    transmitting the diagnostic packet stream from a maintenance association end point (MEP) of a source object addressed by the source address across the communications network at a configurable time period;
    receiving a returning packet stream;
    incrementing a counter value if source address in the returning packet stream matches with address of the source object and resetting the counter value if the source address in the returning packet stream mismatches with the address of the source object;
    declaring loop detection at a port if the counter value matches with a predefined number;
    identifying a port having a loop condition in response to the loop detection and reporting the loop condition to a network administrator; and
    redirecting network traffic from the port and activating a backup path from the source object to a destination node; and redirecting network traffic via the backup path.

2. The method of claim 1, further comprising announcing the loop detection to avoid multicasting in accordance with the loop detection.

3. The method of claim 1, wherein transmitting the diagnostic packet stream from a source object addressed by the source address across the communications network at a configurable time period further includes initiating heart beats to detect loops.

4. The method of claim 1, wherein receiving a returning packet stream from a destination object includes capturing a returning diagnostic packet from a remote port which is looped in response to a fault.

5. The method of claim 1, wherein declaring loop detection at a port in response to a comparison between a source address in source address field of the returning packet stream and address of the source object further includes extracting the source address from the returning packet stream.

6. The method of claim 5, wherein declaring loop detection at a port level in response to a comparison between a source address in source address field of the returning packet stream and address of the source object further includes identifying the source address from the source object.

7. The method of claim 6, wherein declaring loop detection at a port level in response to a comparison between a source address in source address field of the returning packet stream and address of the source object further includes comparing the source address from the returning packet stream and the source address from the diagnostic packet stream.

8. A network diagnostic logic device, comprising:
    a first logic entity; and
    a second logic entity having a maintenance association end point (MEP) configured to employ connectivity fault management (CFM) and coupled with the first logic entity via an Ethernet based communications network, wherein the second logic entity is capable of transmitting and receiving a continuity check message (CCM) to and from the first logic entity via down MEP at every configurable time period for loop diagnosis, wherein the second logic entity further includes,
    a counter able to increment its value when the MEP determines that a match has occurred between address in a source address field from a received CCM and address of the MEP, and capable of resetting its value when the address in the source address field mismatches with the address of the MEP,
    a loop detector configured to declare a loop condition at a port when the value in the counter reaches to a predefined number of consecutive loop detections, and
    an activating component capable of activating a backup path from the source object to a destination node and redirecting network traffic via the backup path.

9. The device of claim 8, wherein the first logic entity is a destination router and the second logic entity is a source router.

10. The device of claim 8, wherein the second logic entity announces a port level loop detection when a MAC address received from the first logic entity matches with the source MAC address.

11. A network component configured to detect loop condition in an Ethernet communications network comprising the device of claim 8.

12. An apparatus for facilitating a communications network, comprising:
    means for composing a diagnostic packet stream a source address in a source address field and a continuity check message (CCM) configured to detect connectivity failures in a maintenance association;
    means for transmitting the diagnostic packet stream from a maintenance association end point (MEP) of a source object addressed by the source address across the communications network at a configurable time period;
    means for receiving a returning packet stream;
    means for incrementing a counter value if source address in the returning packet stream matches with address of the source object or means for resetting the counter value if the source address in the returning packet stream mismatches with the address of the source object;
    means for declaring loop detection at a port if the counter value matches with a predefined number;
    means for identifying a port having a loop condition in response to the loop detection;
    means for reporting the loop condition to a network administrator; and
    means for redirecting network traffic from the port and means for activating a backup path from the source object to a destination node; and means for redirecting network traffic via the backup path.

13. The apparatus of claim 12, wherein means for transmitting the diagnostic packet stream from a source object addressed by the source address across the communications network at a configurable time period further includes means for initiating heart beats to detect loops at link level.

14. The apparatus of claim 12, wherein means for receiving a returning packet stream from a destination object includes means for capturing a returning diagnostic packet from a remote port which is looped in response to a fault.

15. The apparatus of claim 12, wherein means for declaring loop detection at a port in response to a comparison between a source address in source address field of the returning packet stream and address of the source object further includes means for extracting the source address from the returning packet stream.

\* \* \* \* \*